United States Patent [19]

Arzt

[11] Patent Number: 4,585,178

[45] Date of Patent: Apr. 29, 1986

[54] COAL CAR THAWING SYSTEM

[76] Inventor: Allan H. Arzt, 4310 Mary Ave., Baltimore, Md. 21206

[21] Appl. No.: 265,061

[22] Filed: May 19, 1981

[51] Int. Cl.$^4$ .................. B02C 11/08; B02C 21/00
[52] U.S. Cl. ..................................... 241/23; 219/200; 219/202; 219/385; 219/421; 219/427; 241/65; 241/101.2; 241/101.5
[58] Field of Search .................. 241/25, 23, 65, 101.5, 241/1, 101.2; 219/10.55 R, 10.49 R, 200, 201, 202, 214, 385, 421, 427, 438, 520, 521, 522; 105/451; 62/351

[56] References Cited

U.S. PATENT DOCUMENTS

| | | | |
|---|---|---|---|
| 2,523,212 | 9/1950 | Hight | 105/451 |
| 3,544,762 | 12/1970 | Eisler | 62/351 X |
| 3,583,334 | 6/1971 | Schuller | 105/377 |
| 3,583,335 | 6/1971 | Schilf | 105/377 |
| 3,800,858 | 4/1974 | Placek | 105/451 X |
| 3,952,539 | 4/1976 | Hanson | 62/351 |

*Primary Examiner*—Howard N. Goldberg
*Assistant Examiner*—Timothy V. Eley
*Attorney, Agent, or Firm*—John F. McClellan, Sr.

[57] ABSTRACT

A system for discharging coal frozen in railroad gondola cars includes provision for passing current through the shell of a gondola to melt the icy interface between coal and gondola, and for dropping the frozen coal out of the gondola by inverting the gondola; an embodiment includes shaking the gondola while inverted, after which the coal may be mechanically broken; special articulated electrodes or high current bus bars with electromagnets for self-holding of the bus bars to the sides of a gondola are disclosed.

15 Claims, 4 Drawing Figures

COAL CAR THAWING SYSTEM

FIELD OF THE INVENTION

This invention relates generally to railroad car dumping systems and particularly to an electric thawing system for gondolas carrying coal and the like in freezing weather for use in conjunction with car dumping.

BACKGROUND OF THE INVENTION

One of the difficult and expensive problems in railroading is that of removing coal from open gondola rail cars to which the coal is frozen.

Present practice is to bake trains of cars in sheds for several hours to thaw the entire contents enough for removal. Heating to the temperatures necessary and for the length of time necessary in this method sometimes ignites the upper layer of coal. The fixed facilities and energy and the time required make this a very expensive system, and one that has some danger associated with it because of potential fume and fire hazards.

PRIOR DISCLOSURES

There are many prior disclosures of car dumpers. Heating frozen coal with microwaves is known as is heating with infrafred heaters along the tracks beneath coal cars. Heating cars by placing them in large hot sheds is also known, as noted.

OBJECTS OF THE INVENTION

A principal object of this invention is to use the metal of the car itself as a resistance heater.

Among other important objects of this invention are to remove coal from coal cars rapidly and efficiently during extreme low temperatures (when coal is most needed) without necessarily thawing out any of the coal in the cars and to reduce the cost and time and energy and the size of the fixed facilities needed to remove coal frozen to coal cars, with a new system for the purpose.

Further objects are to provide a system as described which eliminates fume hazards.

BRIEF SUMMARY OF THE INVENTION

In brief summary given as cursive description only and not as limitation, the invention includes the steps of attaching electric leads to a gondola in such manner as selectively to heat the frozen interface between coal and gondola, inverting the gondola and dropping out the load of frozen coal.

The above and other objects and advantages of this invention will become more readily apparent on examination of the following description including the drawings in which like characters refer to like reference numerals:

DETAILED DESCRIPTION OF THE INVENTION

Figure 1:
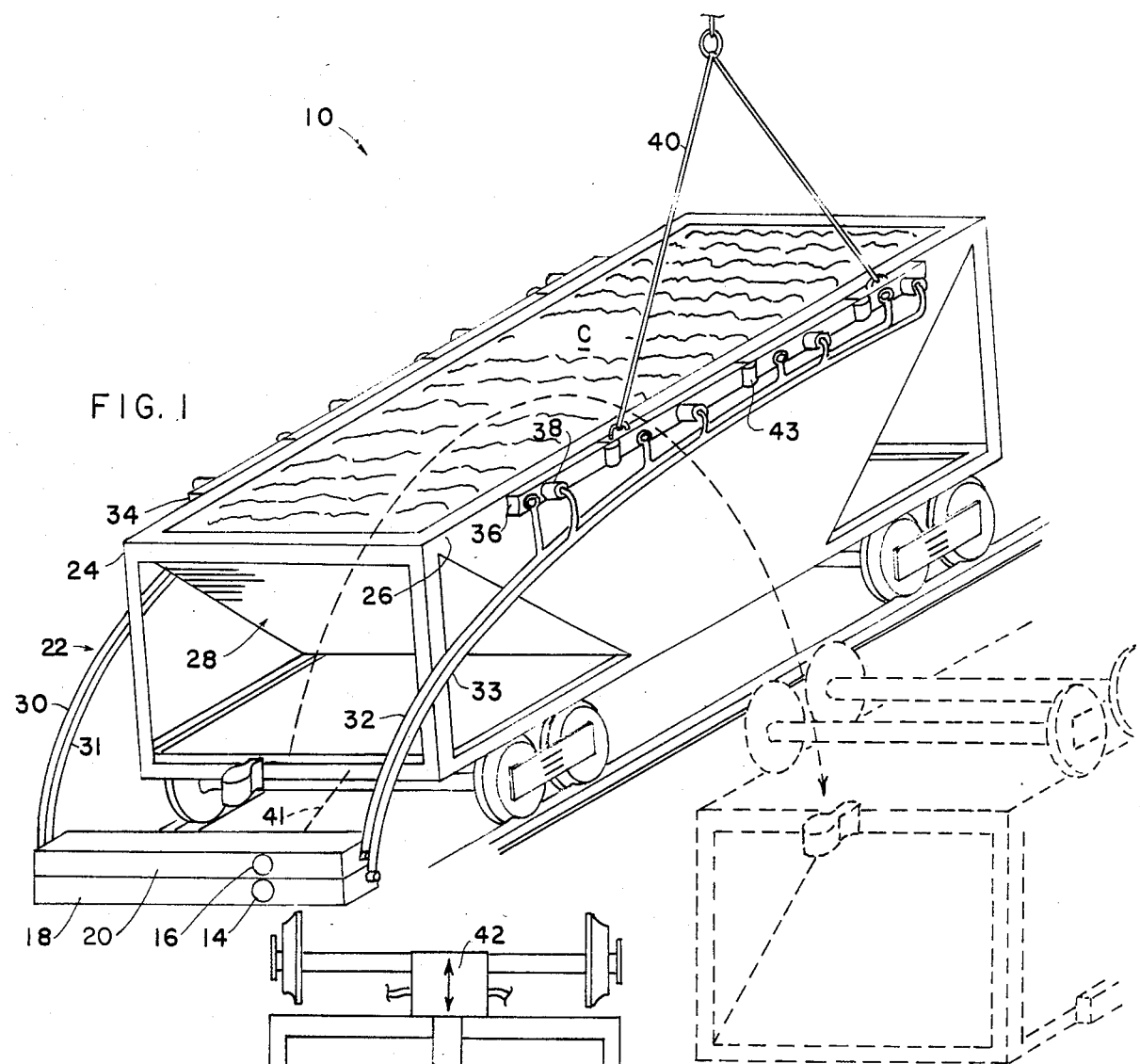
FIG. 1 is a perspective fragmentary diagram of a system according to this invention in use with a coal car.

FIG. 1 diagrams the invention 10 as including respective switches 14, 16 controlling safely low voltage but high-current sources 18, 20 which may provide direct current, means 22 for applying opposite polarity current from source 20 to respective opposite sides 24, 26 of gondola 28 containing frozen coal C so that the interface between coal and car is thawed, and means for inverting the coal car to drop out the load of coal. The sources may be very large welding-sources or the like, and may be attached to a power line or may have conventional generators.

The means for applying the current include high-current leads 30, 32 and preferably flexible or articulated electrode elongate members or bus bars 34, 36, with a plurality of spaced apart electromagnets 38 which are energized from source 18 through cables 31, 33. The electromagnets clamp the bus bars along the upper sides of a typically steel gondola when the current is switched on and make them self-holding. The bus structure may be applied by crane, detachable lines 40 of which are indicated, and may be metal, hinged as at 43.

When current is applied to a typical steel gondola from source 20 it will flow from one upper side of the gondola through the bottom to the other side. The resistance of the steel structure of the gondola will cause it to heat up and melt the icy layer of frozen rain or mine wash water at the coal interface with the steel. The gondola may then be inverted as indicated at right by the broken lines and arc-shaped arrow, at any stage of heating or before. The sources 18, 20 may be attached to the gondola (broken line 41) or the connecting lines may provide enough slack for the purpose.

Figure 2:
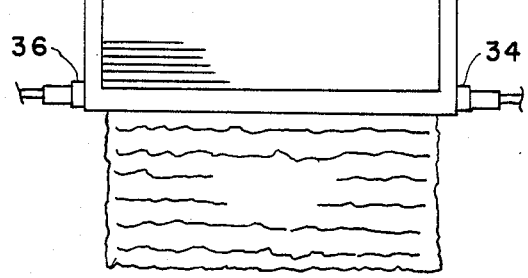
FIG. 2 is an elevational fragmentary diagram.

FIG. 2 shows the next step, in which the gondola 28, inverted by any suitable device such as those described in U.S. Pat. No. 3,583,334 issued to J. J. Shuffer on 6-8-71 or U.S. Pat. No. 3,583,335 issued to H. M. Schill on 6-8-71, dumps the load of coal C. The current through the bus bars 34, 36 may be left on in this position until the coal falls, as an economical test of heating sufficiency; or if experience indicates that similar gondolas require a relatively predictable amount of heating, the electrical structure may be removed after that heating and before inversion.

If the coal C tends to stick at this stage any conventional suitable car shaker, symbolized by a conventionally attached, low-frequency oscillation solenoid 42, may be conventionally clamped to the car to loosen the coal further; particularly if any small volumes remain adhering to the car in an area the shaker may be applied at the location by crane. Lines to the shakers may provide enough slack for the inversion or the shaker may be applied after car-inversion.

Figure 3:
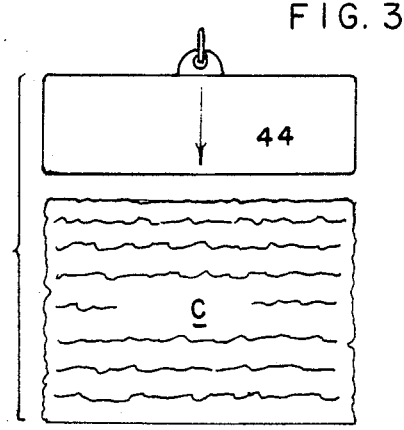
FIG. 3 is an elevational fragmentary diagram.

FIG. 3 shows an optional next step, crushing the mass of coal C to intended-use size, mechanical crushing being much more energy efficient than artificial thawing. Any conventional means such as a drop-hammer 44 may be used for this.

Figure 4:
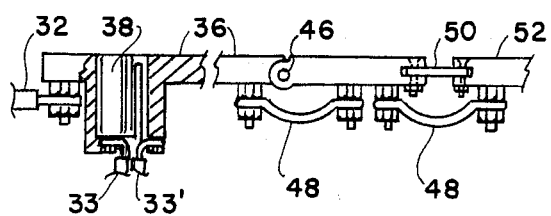
FIG. 4 is a fragmentary detail of an electrical system.

FIG. 4 indicates the simplicity of the circuitry and of the bus structure represented by 36, a small but representative detail being shown.

Line 32 from the generator, battery, or other power source (20 FIG. 1) of from an alternating current source, if desired, is secured in conventional manner to the bus bar 36. Current may, through conventional provisions, flow through bus bar and car to the bus bar on the other side of the car. Current from the source 18 flows through conduit 33' and returns through the other lead of 33, to actuate electromagnet 38.

For articulation of the bus bars, non-metallic hinge pins 46 of "Nylon" or the like may be used for non-corroding qualities, and at each a flexible jumper 48 may electrically bridge over the flexible joint; such articulation of the bus bars provides means for accommodation to irregularities of the sides of gondolas by flexing or by bending.

An alternative means for flexing or bending is shown at 50, a non-metallic member such as a "Nylon" strap spliced between sections 52 and with a jumper 48 bridging it.

If desired, each bus bar may be supplied with an individual line for each section, the lines being conventionally supplied with current manually or automatically regulated to take account of the path resistance at each particular location along the gondola.

The bus bars may extend the length of the gondola or may be somewhat but not substantially shorter. The current flow is preferably to be uniformly distributed for speed in thawing and the long electrodes provide for this. The bus bars may be of copper or other high-conductivity material.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for discharging a load of coal frozen at an icy interface to a railroad car such as a gondola, comprising: means for passing current through a said gondola along a path melting said ice at the interface; and means for inverting said gondola and discharging a said load of coal therefrom as result of melting of said icy interface.

2. A system as recited in claim 1, the means for passing current including: a source of current, and means for connecting said source of current to opposite sides of a said gondola.

3. A system as recited in claim 2, said means for connecting including means for accommodating to irregularities along the sides of a said gondola.

4. A system as recited in claim 3, and means for self-holding of said means for connecting on a said gondola.

5. A system as recited in claim 3, the means for accommodating including each means for connecting being an elongate member with at least one means therein for bending.

6. A system as recited in claim 4, the self-holding means including a plurality of electromagnets on said means for connecting.

7. A system as recited in claim 5, the bending means being a flexible portion.

8. A system as recited in claim 7, the flexible portion being non-metallic and having a jumper thereacross.

9. A system as recited in claim 5, the bending means being a hinge joint.

10. A system as recited in claim 9, the hinge joint being non-metallic and having a jumper thereacross.

11. A system as recited in claim 1, and means for shaking the gondola while inverted.

12. A system as recited in claim 11, and mechanical means for breaking the coal after discharge.

13. A method of discharging a load of coal frozen in a gondola comprising: passing a current through said gondola and resistance-heating the interface between coal and gondola; and inverting said gondola and dropping the coal out as a frozen unit.

14. A method of discharging as recited in claim 13, and shaking said gondola while inverted.

15. A method of discharging as recited in claim 13, and the additional step of mechanically breaking the coal after discharge.

* * * * *